US009736863B2

United States Patent
Yang et al.

(10) Patent No.: US 9,736,863 B2
(45) Date of Patent: Aug. 15, 2017

(54) METHOD AND APPARATUS FOR PREAMBLE DETERMINATION

(71) Applicant: Telefonaktiebolaget L M Ericsson (publ), Stockholm (SE)

(72) Inventors: Zhiyu Yang, Jiangsu (CN); Junjie Yan, Jiangsu (CN); Zhenhong Zhou, Jiangsu (CN)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 42 days.

(21) Appl. No.: 14/900,373

(22) PCT Filed: Jun. 27, 2013

(86) PCT No.: PCT/CN2013/078137
§ 371 (c)(1),
(2) Date: Dec. 21, 2015

(87) PCT Pub. No.: WO2014/205723
PCT Pub. Date: Dec. 31, 2014

(65) Prior Publication Data
US 2016/0174261 A1    Jun. 16, 2016

(51) Int. Cl.
*H04W 74/08* (2009.01)
*H04L 5/00* (2006.01)
(Continued)

(52) U.S. Cl.
CPC ....... *H04W 74/0833* (2013.01); *H04L 5/0048* (2013.01); *H04L 5/0053* (2013.01); *H04L 27/261* (2013.01); *H04L 69/22* (2013.01)

(58) Field of Classification Search
None
See application file for complete search history.

(56) References Cited

U.S. PATENT DOCUMENTS

2008/0080472 A1    4/2008  Bertrand et al.
2009/0046629 A1*   2/2009  Jiang ................. H04J 13/0059
                                                 370/328
(Continued)

FOREIGN PATENT DOCUMENTS

CN    101090281 A    12/2007
CN    101227734 A     7/2008
(Continued)

OTHER PUBLICATIONS

3GPP, "3rd Generation Partnership Project; Technical Specification Group Radio Access Network; Evolved Universal Terrestrial Radio Access (E-UTRA); Physical Channels and Modulation (Release 11)", 3GPP TS 36.211 V11.0.0, Sep. 2012, 1-106.

*Primary Examiner* — Brian Roberts
(74) *Attorney, Agent, or Firm* — Murphy, Bilak & Homiller, PLLC (57) ABSTRACT

Methods and apparatuses for preamble determination have been provided. A method for transmitting a preamble by a user equipment to a base station is provided. The method comprises: selecting a random access resource for transmitting a preamble; determining one root sequence allocated to the random access resource based on a mapping relationship between root sequences and random access resources; generating a preamble based on the root sequence; and transmitting the preamble on the random access resource. The mapping relationship is established based on a rule that a random access resource carries preambles generated from a same root sequence.

18 Claims, 7 Drawing Sheets

(51) Int. Cl.
*H04L 27/26* (2006.01)
*H04L 29/06* (2006.01)

(56) References Cited

U.S. PATENT DOCUMENTS

| | | | | |
|---|---|---|---|---|
| 2010/0182974 A1* | 7/2010 | Barraclough | ....... | H04W 74/006 370/329 |
| 2010/0322096 A1* | 12/2010 | Hsu | ............ | H04W 74/002 370/252 |
| 2011/0014922 A1* | 1/2011 | Jen | ............ | H04W 74/002 455/450 |

FOREIGN PATENT DOCUMENTS

| | | |
|---|---|---|
| CN | 101394226 A | 3/2009 |
| CN | 101505522 A | 8/2009 |
| CN | 101594691 A | 12/2009 |
| EP | 2120379 A1 | 11/2009 |
| WO | 2008052041 A2 | 5/2008 |

\* cited by examiner

METHOD AND APPARATUS FOR PREAMBLE DETERMINATION

TECHNICAL FIELD

Embodiments of the present invention generally relate to communication systems, and more particularly to a method, an apparatus, a user equipment, a base station, and a computer readable storage medium for preamble determination.

BACKGROUND

This section introduces aspects that may facilitate a better understanding of the invention(s). Accordingly, the statements of this section are to be read in this light and are not to be understood as admissions about what is in the prior art or what is not in the prior art.

In Long-Term Evolution (LTE) system, the uplink (UL) physical channel "physical random access channel (PRACH)" is used to carry Message 1 (MSG1), i.e., preamble sequences for random access. According to 3GPP TS 36.211 V11.0.0 (2012-09), "$3^{rd}$ Generation Partnership Project; Technical Specification Group Radio Access Network; Evolved Universal Terrestrial Radio Access (E-UTRA); Physical Channels and Modulation (Release 11)", chapter 5.7.2 "Preamble sequence generation", the random access preambles are generated from Zadoff-Chu sequences with zero correlation zone, generated from one or several root Zadoff-Chu sequences. The network configures the set of preambles sequences the user equipment (UE) is allowed to use.

There are 64 preambles available in each cell. The set of 64 preamble sequences in a cell is found by including all the available cyclic shifts of a root Zadoff-Chu sequence with the logical index RACH_ROOT_SEQUENCE in the order of increasing cyclic shift, where RACH_ROOT_SEQUENCE is broadcasted as part of the System Information. Additional preamble sequences, in case 64 preambles cannot be generated from a single root Zadoff-Chu sequence, are obtained from the root sequences with the consecutive logical indexes until all the 64 sequences are found. The logic root sequence order is cyclic: the logic index is consecutive from 0 to 837. The relation between a logic root sequence index and a physical root sequence index u is given in 3GPP TS 36.211, and each physical root sequence index corresponds to a logical index RACH_ROOT_SEQUENCE.

The $u^{th}$ root Zadoff-Chu sequence is defined by $$x_u(n) = e^{-j\frac{\pi u n(n+1)}{N_{ZC}}}, 0 \leq n \leq N_{ZC} - 1$$

where $N_{ZC}$ is the length of the Zadoff-Chu sequence, and for preamble format 0-3, $N_{ZC}$ equals to 839; for preamble format 4, $N_{ZC}$ equals to 139.

From the $u^{th}$ root Zadoff-Chu sequence, floor($N_{ZC}/N_{CS}$) cyclically shifted sequences are obtained by cyclic shifts of $N_{CS}$, where $N_{CS}$ is the cyclic shift value used for random access preamble generation, which is broadcasted as part of System Information Block 2 (SIB2).

One of the reasons why LTE system uses cyclically shifted Zadoff-Chu sequences for preamble sequence generation is that the cross-correlation between different preambles based on cyclic shifts of the same root Zadoff-Chu sequence is zero at the receiver as long as the cyclic shift $N_{CS}$ used when generating the preambles is larger than the maximum round-trip propagation time in the cell plus the maximum delay spread of the channel. Therefore, due to the ideal cross-correlation property, there is no intra-cell interference from multiple random-access attempts using preambles derived from the same Zadoff-Chu root sequence.

To handle different cell sizes, the cyclic shift $N_{CS}$ is signaled as part of the System Information.

In small cells with short propagation time, a small cyclic shift $N_{CS}$ can be configured, resulting in a large number of cyclically shifted sequences being generated from each root sequence. When the number of such cyclically shifted sequences generated from same root sequence exceeds 64, i.e. floor($N_{ZC}/N_{CS}$)≥64, all the 64 preamble sequences can be generated from a same root Zadoff-Chu sequence so that they can be transmitted on a same random access resource without causing any intra-cell interference to each other.

Herein, "a random access resource" refers to a resource block defined in the time domain and the frequency domain and used for transmitting random access signals, which may also be referred to as a random access opportunity, a PRACH resource, a PRACH opportunity, or a PRACH instance. In LTE systems, in frequency domain, one random access resource usually corresponds to 6 consecutive physical resource blocks (PRBs) and in time domain it usually corresponds to a "PRACH window". Here, the duration of a "PRACH window" usually consists of a length $T_{CP}$ of cyclic prefix, a length $T_{SEQ}$ of a sequence part, and a guard period GP, and depends on preamble format.

However, in large cells with longer propagation time, whose cell radii are larger than 1.5 km, a larger cyclic shift $N_{CS}$ needs to be configured resulting in less cyclically shifted sequences being generated from a same root sequence. When 0<floor($N_{ZC}/N_{CS}$)<64, in order to generate all the 64 preamble sequences, multiple root Zadoff-Chu sequences must be used in the large cell. Although the larger number of root sequences is not a problem in itself because there are as many as 838 root Zadoff-Chu sequences in all, the zero cross-correlation property can only hold between shifts of the same root sequence.

Thus, from interference perspective, if one random access resource has to be multiplexed to carry multiple preambles generated from different root Zadoff-Chu sequences, the intra-cell interference from multiple random-access attempts will become unavoidable.

Furthermore, from receiver perspective, according to the existing solution, suppose all the 64 preambles are available in the cell according to SIB 2, the receiver of eNB has to simultaneously detect as many as 64 preambles derived from multiple different root Zadoff-Chu sequences on each PRACH instance, which will be hard for the receiver to achieve "zero erroneous detection".

In a Chinese patent application publication CN101227734A, a method and apparatus for ranking ZC sequences of random access channel is provided. The method comprises establishing mapping relationship between the logical index and the physical index, such that PRACH of a cell phone which utilizes different sequences in a same cell has almost same coverage range. The proposed method needs to change the mapping relationship defined in 3GPP standards.

In another Chinese patent application publication CN101394226A, a random access preamble having multiple Zadoff-Chu sequence is provided for a cellular telephone system. The random access preamble comprises two ZC sequences so as to lessen the Doppler frequency shift effect.

None of the prior art has addressed one or more of the above concerns.

SUMMARY

Therefore, it would be desirable in the art to provide a new solution for preamble determination in order to reduce intra-cell interference.

In a first aspect of the invention, a method for transmitting a preamble by a user equipment to a base station is provided. The method comprises: selecting a random access resource for transmitting a preamble; determining one root sequence allocated to the random access resource based on a mapping relationship between root sequences and random access resources; generating a preamble based on the root sequence; and transmitting the preamble on the random access resource. The mapping relationship is established based on a rule that a random access resource carries preambles generated from a same root sequence.

In some embodiments, according to the mapping relationship, an order of the root sequence is determined based on an order of an initial root sequence and an order of the random access resource within P radio frames, P≥1, and the P radio frames are used for carrying multiple preambles.

In some embodiments, the order of the root sequence is expressed by a logic index $ID'_{root}$ of the root sequence, which is determined as:

$$ID'_{root} = ID_{root} + X',$$

In the above equation, $ID_{root}$ is a logic index of the initial root sequence, X' is a serial number indicating the order of the random access resource within the P radio frames, P is the minimum number of radio frames which are required for covering R root sequences, and R is the minimum number of root sequences which are required for generating the multiple preambles, R>1.

In some embodiments, the serial number X' of the random access resource is determined as:

when $R \geq D_{RA}$, $$X' = \begin{cases} (k \bmod P) \times D_{RA} + X & \text{if } (k \bmod P) \times D_{RA} + X < R \\ X & \text{otherwise} \end{cases};$$

when $0 < R < D_{RA}$, $$X' = (X \bmod R);$$

In the above equations, $D_{RA}$ is a density of random access resource per radio frame; X is a local number of the random access resource within one radio frame; k is the system frame number, SFN, of a radio frame where the random access resource is located; and if $D_{RA}=0.5$ and all the random access resources are only in radio frames which have odd SFN, the SFN k in the above equation is replaced with k'=k−1.

In some embodiments, the local number X of the random access resource is determined as: when $D_{RA} \geq 1$, the local number X is numbered as 0, 1, . . . , $D_{RA}-1$ sequentially in time first and then in frequency if and only if time multiplexing is not sufficient to hold all the $D_{RA}$ random access resources within one radio frame without overlap in time; and when $D_{RA}=0.5$, the local number X is numbered as 0.

In a second aspect of the invention, a method for detecting a preamble received from a user equipment is provided. The method comprises: receiving a signal from a random access resource; determining one root sequence allocated to the random access resource based on a mapping relationship between root sequences and random access resources; and detecting a preamble carried on the random access resource based on the root sequence. The mapping relationship is established based on a rule that a random access resource carries preambles generated from a same root sequence.

In a third aspect of the present invention, a user equipment is provided. The user equipment comprises: a selection unit, configured to select a random access resource for transmitting a preamble; a determination unit, configured to determine one root sequence allocated to the random access resource based on a mapping relationship between root sequences and random access resources; a generation unit, configured to generate a preamble based on the root sequence; and a transmission unit, configured to transmit the preamble on the random access resource. The mapping relationship is established based on a rule that a random access resource carries preambles generated from a same root sequence.

In a fourth aspect of the present invention, a base station is provided. The base station comprises: a receiving unit, configured to receive a signal from a random access resource; a determination unit, configured to determine one root sequence allocated to the random access resource based on a mapping relationship between root sequences and random access resources; and a detection unit, configured to detect a preamble carried on the random access resource based on the root sequence. The mapping relationship is established based on a rule that a random access resource carries preambles generated from a same root sequence.

In a fifth aspect of the invention, a computer-readable storage media having computer program code stored thereon is provided. The computer program code is configured to, when executed, cause an apparatus to perform actions in the method according to the first aspect of the invention or the second aspect of the invention.

Particular embodiments of the subject matter described in this specification can be implemented so as to realize one or more of the following advantages.

With particular embodiments of the techniques described in this specification, the "zero cross-correlation" property between different preambles on any random access resource is guaranteed so that intra-cell interference from multiple random-access attempts on a same random access resource is decreased to close to zero, thereby the success rate of preamble detection and random access can be increased remarkably. Further, the base station can detect preamble ID(s) more rapidly and correctly because it can forecast the root Zadoof-Chu sequence used by the preamble(s) on the corresponding random access resource in advance.

Other features and advantages of the embodiments of the present invention will also be understood from the following description of specific embodiments when read in conjunction with the accompanying drawings, which illustrate, by way of example, the principles of embodiments of the present invention.

BRIEF DESCRIPTION OF THE DRAWINGS

The above and other aspects, features, and benefits of various embodiments of the invention will become more fully apparent, by way of example, from the following detailed description and the accompanying drawings, in which.

Like reference numbers and designations in the various drawings indicate like elements.

DETAILED DESCRIPTION

Hereinafter, the principle and spirit of the present invention will be described with reference to the illustrative embodiments. It should be understood, all these embodiments are given merely for the skilled in the art to better understand and further practice the present invention, but not for limiting the scope of the present invention. For example, features illustrated or described as part of one embodiment may be used with another embodiment to yield still a further embodiment. In the interest of clarity, not all features of an actual implementation are described in this specification.

While it is described below in the context of a LTE type cellular network for illustrative purposes and since it happens to be well suited to that context, those skilled in the art will recognize that the invention disclosed herein can also be applied to various other types of cellular networks.

Based on the analysis in the Background section, it can be seen that the root cause of the problem of "erroneous preamble detection" in large cells is that many preambles sequences derived from different root Zadoof-Chu sequences don't have "zero cross-correlation" property, but can be transmitted on a same random access resource, i.e., same time-frequency physical resource, which may cause strong intra-cell interference to each other.

In order to solve the above problem, embodiments of the present invention have combined orthogonality of physical time-frequency resource with the "zero cross-correlation" property of cyclic shifts of the same root Zadoff-Chu sequence together and thus a mapping mechanism for mapping between root sequences and random access resources is introduced. The mapping mechanism is established based on a rule that a random access resource carries preambles generated from a same root sequence.

For illustration, embodiments of the present invention is described in a scenario where a plurality (e.g., M) of preambles are generated from R root sequences, M and R are integers greater than 1. However, after reading the description of the exemplary embodiments, the skilled person would appreciate that the proposed mechanism may also be applied in a scenario where R is equal to 1. In LTE systems, the number M of preambles is 64. However, other values may also be possible for M, depending on system configuration. Furthermore, Zadoff-Chu sequence is described as an example of root sequence, and other sequences with similar property may also be used as root sequence.

Figure 1:
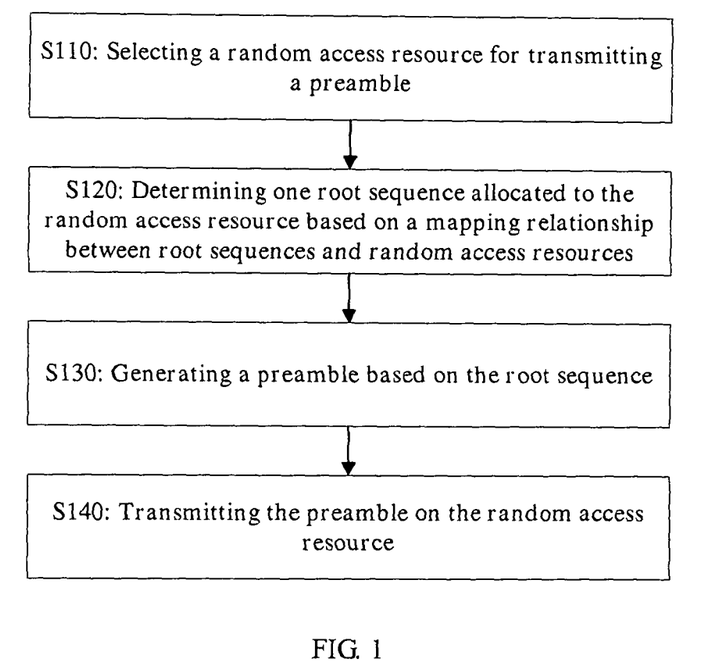
FIG. 1 illustrates an exemplary process flow of a method in a user equipment for transmitting a preamble according to embodiments of the present invention.

FIG. 1 illustrates an exemplary process flow of a method in a user equipment for transmitting a preamble according to embodiments of the present invention.

As shown in FIG. 1, at step S110, a user equipment (UE) selects a random access resource for transmitting a preamble. Generally, the UE can obtain configuration information about random access resources from its serving base station (BS). The configuration information may be indicated by a PRACH configuration index, which is sent as System Information through Downlink Shared Channel (DL-SCH) from the BS.

In 3GPP TS 36.211, "PRACH configuration index" is used to represent: (1) preamble format; (2) Density of random access resources per radio frame ($D_{RA}$), and (3) PRACH position in time-frequency domain. Based on the PRACH configuration index, the UE can know which resource(s) is/are allocated as random access resource(s), i.e., PRACH resource(s), and selects one for transmitting a preamble.

Then, at step S120, the UE determines one root sequence allocated to the selected random access resource based on a mapping relationship between root sequences and random access resources. The mapping relationship is established based on a rule that a random access resource carries preambles generated from a same root sequence.

According to the mapping relationship, only the preambles based on cyclic shifts of the same root sequence can use a same "random access resource" for transmission. In other words, one "random access resource" can only be multiplexed to carry up to N preambles which are generated from a same root sequence, where N is the number of preambles which can be generated from one root sequence. Here, N can be determined as:

$$N = \text{floor}(N_{ZC}/N_{CS}),\qquad\text{(Eq. 1)}$$

where $N_{ZC}$ is the length of the Zadoff-Chu sequence, and $N_{CS}$ is the cyclic shift value used for random access preamble generation, which is broadcasted as part of System Information Block 2 (SIB2).

To generate all the M (e.g., M=64) preambles, at least R root sequences are required, which can be determined as:

$$R = \text{ceiling}(M/N) = \text{ceiling}[M/\text{floor}(N_{ZC}/N_{CS})], \quad \text{(Eq. 2)}$$

To cover all the R root sequences, at least P radio frames are required, which can be determined as:

$$P = \text{ceiling}(R/D_{RA}) = \text{ceiling}\{\text{ceiling}[M/\text{floor}(N_{ZC}/N_{CS})]/D_{RA}\}, \quad \text{(Eq. 3)}$$

where $D_{RA}$ is the density of random access resources per radio frame and is broadcasted by the BS via "PRACH configuration index" on DL-SCH, and P≥1.

In some preferable embodiments, during one preamble generation period (i.e., random access resources for carrying M preambles), one root sequence can only correspond to one random access resource, and thus P is the minimum number of radio frames which are required for covering R root sequences. In some further embodiments, the R root sequences are mapped sequentially to random access resources within the P radio frames. In such embodiments, an order of the root sequence allocated to the selected random access resource is determined based on an order of an initial root sequence of the R root sequences and an order of the selected random access resource within the P radio frames.

In some other embodiments, there is no need to obtain the order of a random access resource within P radio frames. Instead, the order of a random access resource within P radio frames may be indicated by both a frame number/order of a radio frame where the random access resource is located and a random access resource number/order of the random access resource in each frame. By using the frame number and the random access resource number in each frame in conjunction with the order of the initial root sequence of the R root sequences, the order of the root sequence allocated to the selected random access resource may also be determined.

The BS can inform the UE information about the order of the initial root sequence of the R root sequences. In one embodiment, the BS can notify the order of the initial root sequence among all the root sequence. For example, in LTE systems, the order of the initial root sequence can be expressed by a logic index $ID_{root}$ of the initial root sequence, which is broadcasted by the BS through DL-SCH as System Information (RACH_ROOT_SEQUENCE), and there are 838 available root Zadoff-Chu sequences in all. Thereby, the logic indexes of all the R root sequences can be obtained by increasing the logic index $ID_{root}$ of the initial root sequence with a predefined delta value. In one embodiment, the delta value is equal to 1.

For example, starting from the initial root sequence with the logic index $ID_{root}$, each root sequence will correspond to a unique random access resource, which means that the root sequence indexed by the logic index $ID_{root}$ will be mapped to a random access resource with an order of 0 within the P radio frames, the root sequence indexed by $ID_{root}+1$ will be mapped to a random access resource with an order of 1, the root sequence indexed by $ID_{root}+2$ will be mapped to a random access resource with an order of 2, and so on, so that the R root sequences are mapped sequentially to R random access resources within the P radio frames. Thereby, all of the N preambles which are generated from the same root sequence indexed by $ID_{root}+m$ (0≤m<R) can only be carried on the random access resource of number m.

The above correspondence can be expressed as:

$$ID'_{root} = ID_{root} + X', \quad \text{(Eq. 4)}$$

where $ID'_{root}$ is a logic index of the root sequence allocated to the selected random access resource, $ID_{root}$ is a logic index of the initial root sequence, X' is a serial number indicating the order of the selected random access resource within the P radio frames, and X' is one of the value in the range of [0, 1, 2, . . . , R−1]. Having determined the logic index of the root sequence, the UE can obtain the physical index of the root sequence according to the relation between logic root sequence indexes and physical root sequences indexes as defined in 3GPP TS 36.211. Therefore, the root sequence allocated to the selected random access resource can be determined.

Although the above preferable embodiments are described with a rule that one root sequence can only correspond to one random access resource, the skilled in the art can easily envisage other embodiments where one root sequence can correspond to more than one random access resource, as long as that one random access resource only corresponds to one root sequence, i.e., one random access resource carries preambles generated from a same root sequence.

The order of the random access resource, i.e., the serial number X', is determined based on an order of the random access resource within each radio frame and an order of a radio frame, where the random access resource is located, within the P radio frames. The detail of the determination of the order of the random access resource, i.e., the serial number X', will be described later with reference to FIGS. 3-12.

Having determined the root sequence allocated to the selected random access resource, the UE generates a preamble based on the root sequence at step S130.

As described previously, one root sequence can generate N preambles based on cyclic shifts of the root sequence. The cyclic shift value $N_{CS}$ used for random access preamble generation is broadcasted as part of System Information Block 2 (SIB2) by the BS. The UE can generate one of the N preambles based on the determined root sequence randomly. The generation of the preamble is well known to the skilled in the art, for example as described in 3GPP TS 36.211, and thus the description thereof is omitted here.

Then, at step S140, the UE can transmit the generated preamble on the selected random access resource.

From the above description of exemplary embodiments, the "zero cross-correlation" property between different preambles on any random access resource is guaranteed so that intra-cell interference from multiple random-access attempts on a same random access resource is decreased to close to zero, thereby the random access can be increased remarkably.

Figure 2:
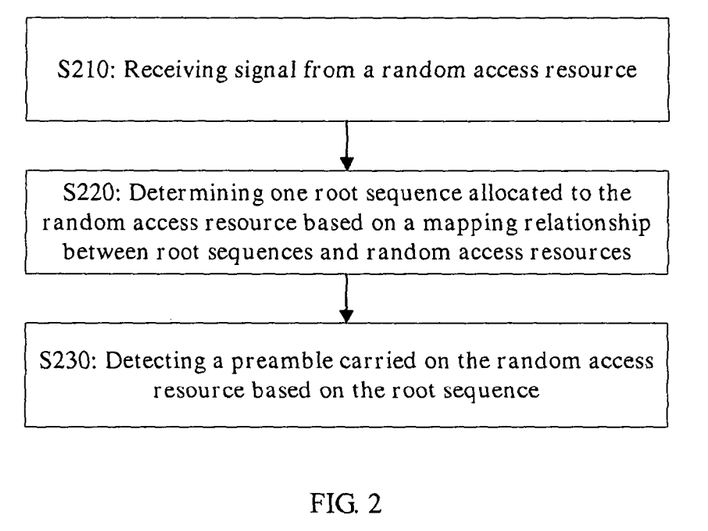
FIG. 2 illustrates an exemplary process flow of a method in a base station for detecting a preamble according to embodiments of the present invention.

FIG. 2 illustrates an exemplary process flow of a method in a base station for detecting a preamble according to embodiments of the present invention. The base station (BS) receives physical random access channel (PRACH), and detects any possible preambles on the PRACH.

As shown in FIG. 2, for each random access resource, at step S210, the base station (BS) receives a signal from the random access resource. Apparently, the BS knows the configuration of the random access resource, such as the preamble format, the density of random access resource per radio frame ($D_{RA}$), and PRACH position in time-frequency domain. The random access resource is used by UEs to carry preamble sequences for random access. Thus, the BS receives a signal from the random access resource to detect whether there is any UE transmitting preamble on the random access resource. As described previously, according to embodiments of the present invention, the random access preambles carried on one random access resource are generated from a same root Zadoff-Chu sequences.

Then, at step S220, the BS determines one root sequence allocated to the random access resource based on a mapping relationship between root sequences and random access resources. The mapping relationship is established based on a rule that a random access resource carries preambles generated from a same root sequence.

The mapping relationship is the same as that described with respect to FIG. 1, and thus the detail thereof may be referred to the previous description. Thus, in each specific radio frame in which random access resources have been configured according to e.g. one PRACH configuration index, both UE and BS will use a unified formula (i.e., Eq. 4) to calculate which root sequence should be used to generate/detect the preambles on each specific random access resource. Thereby, the available preambles calculated by UE and BS on each specific random access resource will be consistent.

Having determined the root sequence allocated to the random access resource, the BS detects a preamble carried on the random access resource based on the root sequence at step S230.

As described previously, one root sequence can generate N preambles based on cyclic shifts of the root sequence. Since there may be several UEs which send different preambles to the BS on a same random access resource, to ensure all of the UEs can access to the cell, the BS should detect all of possible preambles from UEs.

The BS will generate all the N preambles based on the determined root sequence, and detect possible preambles on the random access resource by correlating the N preambles with the received signal on that random access resource, respectively. Peaks of the correlation indicate the presence of preambles.

Since the "zero cross-correlation" property between different preambles on any random access resource is guaranteed, the success rate of preamble detection can be increased remarkably. Further, in the prior art, the BS should detect all of the M (e.g. M=64) preambles on each random access resource, but in embodiments of the present invention, the BS will only need to detect all of the N zero-correlation preambles, where N<=M. Thus, according to embodiments of the present invention, the BS can detect preambles more rapidly and correctly because it can forecast the root sequence used by the preamble(s) on the corresponding random access resource in advance.

In the following, the determination of the order of the random access resource, i.e., the serial number X', will be described later with reference to FIGS. 3-12.

There are two types of frame structure. Frame structure type 1 is applicable to frequency division duplex (FDD), and frame structure type 2 is applicable to time division duplex (TDD). The two kinds of frame structures have different random access resource configurations. Reference may be made to 3GPP TS 36.211 where the configurations of the two frame structures have been described.

As described above, the serial number X' of the random access resource is determined based on an order of the random access resource within each radio frame and an order of a radio frame, where the random access resource is located, within the P radio frames. Thus, the method for determining the serial number X' may include two steps. The first step is to temporarily number random access resources in each radio frame, and the second step is to finally number random access resources within the P radio frames.

In the first step, since $D_{RA}$ indicates the number of random access resource per radio frame, the random access resources within each radio frame can be numbered with 0, 1, 2, . . . , $D_{RA}-1$. This number may be referred to as local number X of the random access resource. In current 3GPP standards, $1 \leq D_{RA} \leq 6$, or $D_{RA}=0.5$.

For frame structure type 1 (FDD), since there is at most one random access resource per subframe according to 3GPP TS 36.211, the random access resources only need to be numbered in increasing order of subframe number for each PRACH configuration index. That is, the local number X of the random access resource is numbered as 0, 1, . . . , $D_{RA}-1$ sequentially according to the increasing order of the subframes.

Figure 3:
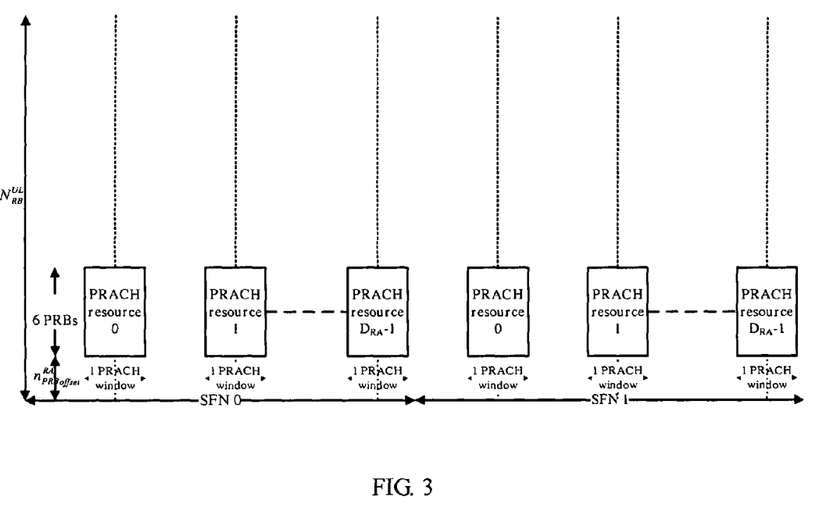
FIG. 3 illustrates temporary random access resources numbering for frame structure type 1 according to embodiments of the present invention.

FIG. 3 illustrates temporary random access resources numbering for frame structure type 1 according to embodiments of the present invention. The horizontal axis represents time, and the vertical axis represents frequency. In current 3GPP standards, one random access resource (i.e., one PRACH resource) corresponds to 6 consecutive PRBs in frequency domain, and it corresponds to a "PRACH window" in time domain. The first physical resource block $n_{PRB}^{RA}$ allocated to the PRACH resource considered for preamble formats 0, 1, 2, and 3 is defined as $n_{PRB}^{RA}=n_{PRBoffset}^{RA}$, where the parameter $n_{PRBoffset}^{RA}$ is configured by higher layers. The parameter $N_{RB}^{UL}$ in FIG. 3 indicates all PRB number of uplink frequency spectrum.

In FIG. 3, there are shown 2 consecutive radio frames with SFN 0 and SFN 1. In each radio frame, the random access resources (i.e., PRACH resources) are numbered as 0, 1, . . . , $D_{RA}-1$ sequentially according to the increasing order of the subframes.

For frame structure type 2 (TDD), there might be multiple random access resources in an uplink subframe according to 3GPP TS 36.211, and the random access resources need to be numbered in time first and then in frequency if and only if time multiplexing is not sufficient to hold all random access resources of a PRACH configuration needed for a certain density value $D_{RA}$ without overlap in time.

Figure 4:
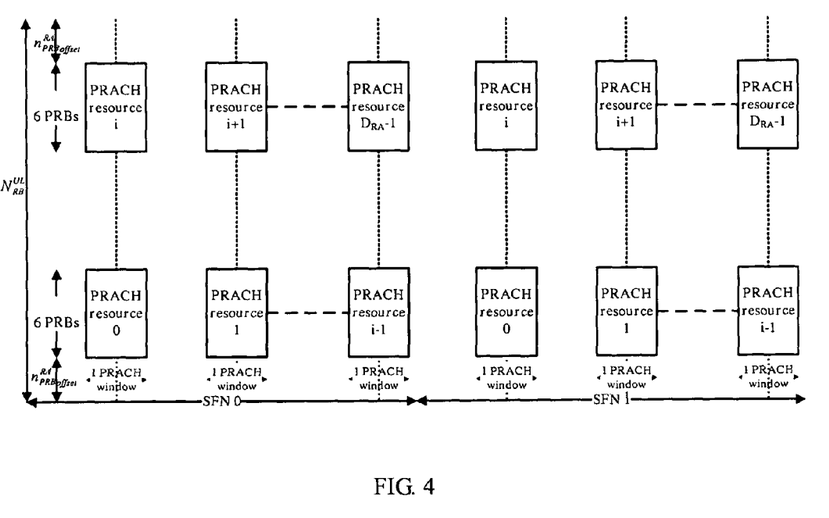
FIG. 4 illustrates temporary random access resources numbering for frame structure type2 according to embodiments of the present invention.

FIG. 4 illustrates temporary random access resources numbering for frame structure type2 according to embodiments of the present invention.

Similar to FIG. 3, there are shown 2 consecutive radio frames with SFN 0 and SFN 1 in FIG. 4. As an example, in radio frame SNF 0, the PRACH resources are number as 0, 1, . . . , i-1 in time first, and then i, i+1, . . . , $D_{RA}-1$ in frequency when the time multiplexing is not sufficient to hold the $D_{RA}$ PRACH resources.

For both frame structure type 1 (FDD) and frame structure type 2 (TDD), there are some special PRACH configurations with $D_{RA}=0.5$, which means that there is only one random access resource every two radio frames, i.e, only odd/even radio frames have one random access resource. In this case, the local number X of this random access resource may be numbered as 0 for convenience. Of course, other value (e.g., 1) may be assigned to the local number X of the random access resource, and the subsequent processing will be adapted accordingly, as will be described later blow.

As described above, at least P radio frames are required for covering R root sequences, and R is the minimum number of root sequences which are required for generating all the M (e.g., 64) preambles. Thus, in the second step, the random access resources within every P radio frames will be renumbered to adapt all the R root sequences.

Starting from the radio frame with SFN $k_0$, where $k_0$ should satisfy $k_0$ mod P=0, within P consecutive radio frames, i.e. SFN $k_0$, SFN($k_0$+1), . . . SFN($k_0$+P-1), renumber the random access resources with 0, 1, 2 ... $D_{RA}-1$, $D_{RA}$, $D_{RA}+1$, $D_{RA}+2$, ... R−1 and then repeat such numbering in next preamble generation period, i.e. from SFN($k_0$+P) to SFN($k_0$+2P−1).

Please be noted that, if R>$D_{RA}$, it means that more than one radio frame are required for covering the R root sequences, i.e., P>1. If R=$D_{RA}$, it means that the R root sequences can just fit into one radio frame. If R<$D_{RA}$, it means that one radio frame is enough for the R root sequences, and there are some random access resources left in the radio frame available for root sequences.

In the case of R>$D_{RA}$, in the last radio frame of each preamble generation period, i.e., the radio frame of SFN $k_{last}$, where $k_{last}$ satisfies $k_{last}$ mod P=P−1, may be not all the PRACH instances will be renumbered as per the above renumbering method because within each period, only R PRACH resources corresponding to R root sequences need to be renumbered. Then, in one embodiment, for the remaining S PRACH resources in the radio frame of SFN $k_{last}$, their local PRACH resource numbers obtained in the first step could be kept. Here, $$S=P\times D_{RA}-R=\text{ceiling}\{\text{ceiling}[M/\text{floor}(N_{ZC}/N_{CS})]/D_{RA}\}\times D_{RA}-\text{ceiling}[M/\text{floor}(N_{ZC}/N_{CS})] \quad (Eq. 5)$$

Thus, the above renumbering in case of R≥$D_{RA}$ can be expressed as:

when R≥$D_{RA}$, $$X' = \begin{cases} (k\bmod P)\times D_{RA} + X & \text{if } (k\bmod P)\times D_{RA} + X < R \\ X & \text{otherwise} \end{cases}; \quad (Eq. 6)$$

where X' is the serial number indicating the order of the random access resource within the P radio frames, X is the local number of the random access resource within each radio frame, and k is the SFN of the radio frame where the random access resource is located.

The skilled person in the art could appreciate that, the remaining S PRACH resources may also be renumbered as 0, 1, ..., S−1. Such numbering may also ensure that one PRACH resource carries preambles generated from a same root sequence.

As may recall, for both frame structure type 1 (FDD) and frame structure type 2 (TDD), there are some special PRACH configurations with $D_{RA}$=0.5. In such case, the local number X of the random access resource is numbered as 0 for convenience. Accordingly, if $D_{RA}$=0.5 and all the random access resources are only in radio frames which have odd SFN, then the SFN k in the above equation Eq. 6 is replaced with k'=k−1. For other cases, no change needs to make.

Figure 5:
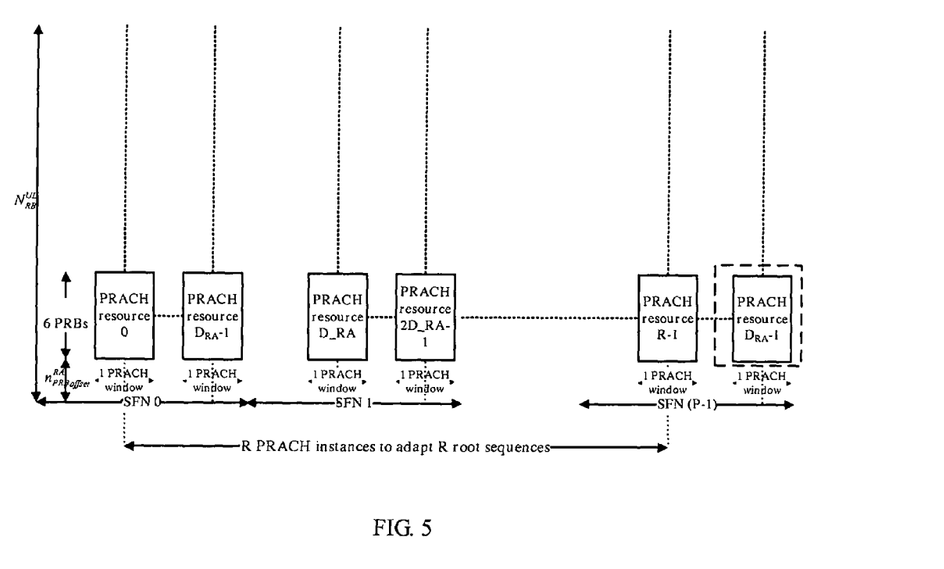
FIG. 5 illustrates final random access resources numbering for frame structure type 1 in case of $R \geq D_{RA}$ according to embodiments of the present invention.

FIG. 5 illustrates final random access resources numbering for frame structure type 1 in case of R≥$D_{RA}$ according to embodiments of the present invention.

FIG. 5 has shown the final numbering for PRACH resources within P consecutive radio frames of SFN 0, SFN 1, ..., SFN (P−1) in case of R≥$D_{RA}$. As can be seen, the first $D_{RA}$ PRACH resources in the radio frame of SFN 0 is renumbered as 0, 1, ..., $D_{RA}$−1, the second $D_{RA}$ PRACH resources in the radio frame of SFN 1 is renumbered as $D_{RA}$, $D_{RA}$+1, ..., 2$D_{RA}$−1, and so on. In the last radio frame of SFN (P−1), in this example shown in FIG. 5, the last PRACH resource in the dotted line frame is remained and its local number in the last radio frame is kept, i.e., $D_{RA}$−1.

Figure 6:
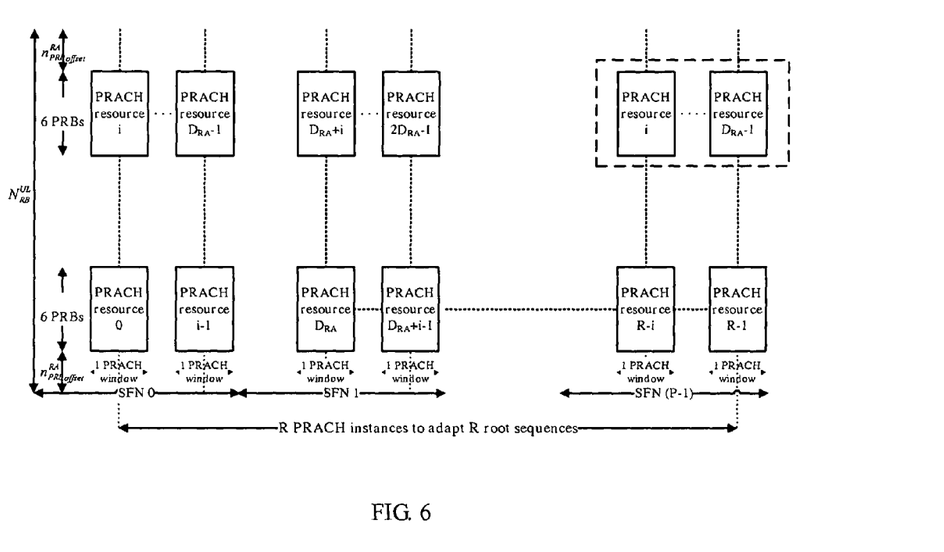
FIG. 6 illustrates final random access resources numbering for frame structure type 2 in case of the $R \geq D_{RA}$ according to embodiments of the present invention.

FIG. 6 illustrates final random access resources numbering for frame structure type 2 in case of the R≥$D_{RA}$ according to embodiments of the present invention.

Similar to FIG. 5, FIG. 6 has shown the final numbering for PRACH resources within P consecutive radio frames of SFN 0, SFN 1, ..., SFN (P−1) in case of R≥$D_{RA}$. As can be seen, the first $D_{RA}$ PRACH resources in the radio frame of SFN 0 is renumbered as 0, 1, ..., i−1, i, ..., $D_{RA}$−1 in time first and then in frequency, the second $D_{RA}$ PRACH resources in the radio frame of SFN 1 is renumbered as $D_{RA}$, $D_{RA}$+1, ..., $D_{RA}$+i−1, $D_{RA}$+i, ..., 2$D_{RA}$−1 in time first and then in frequency, and so on. In the last radio frame of SFN (P−1), in this example shown in FIG. 6, the last S=P×$D_{RA}$−R PRACH resources in the dotted line frame are remained and their local numbers in the last radio frame are kept, i.e., i, i+1, ..., $D_{RA}$−1.

In the case of 0<R<$D_{RA}$, then P=ceiling(R/$D_{RA}$)=1, so any SFN $k_0$ can satisfy $k_0$ mod P=0. That is, the final number of PRACH resource would not be related to the SFN of a radio frame. In this case, within any radio frame, the random access resources can be renumbered with 0, 1, ..., R−1, 0, 1, ..., $D_{RA}$−R−1, and then such numbering is repeated in next radio frame. In other words, there may be multiple preambles generation periods during one radio frame.

Thus, the above renumbering in case of 0<R<$D_{RA}$ can be expressed as:

when 0<R<$D_{RA}$, $$X'=(X \bmod R); \quad (Eq. 7)$$

where X' is the serial number indicating the order of the random access resource within the P (P=1 in this case) radio frames, X is the local number of the random access resource within each radio frame, and R is the minimum number of root sequences which are required for generating M preambles.

Figure 7:
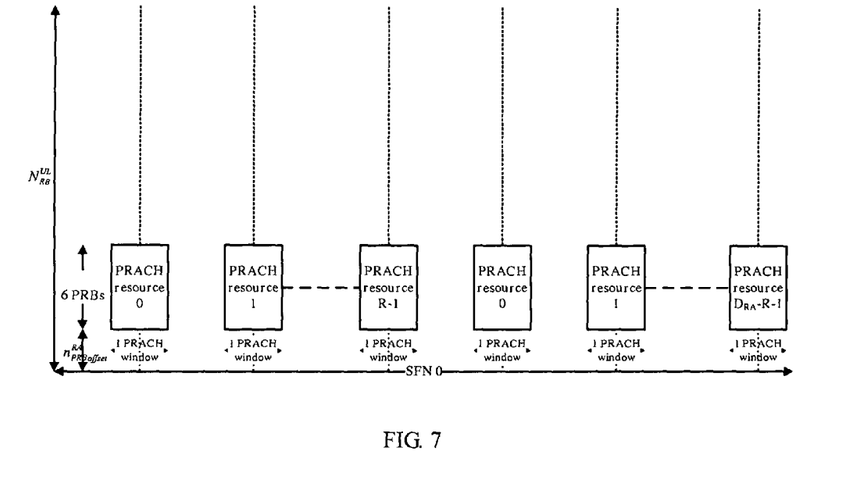
FIG. 7 illustrates final random access resources numbering for frame structure type 1 in case of $0 < R < D_{RA}$ according to embodiments of the present invention.

FIG. 7 illustrates final random access resources numbering for frame structure type 1 in case of 0<R<$D_{RA}$ according to embodiments of the present invention.

FIG. 7 has shown the final numbering for PRACH resources within one radio frame of SFN 0 in case of 0<R<$D_{RA}$. As can be seen, the $D_{RA}$ PRACH resources in the radio frame of SFN 0 is renumbered as 0, 1, ..., R−1, 0, 1, ..., $D_{RA}$−R−1.

Figure 8:
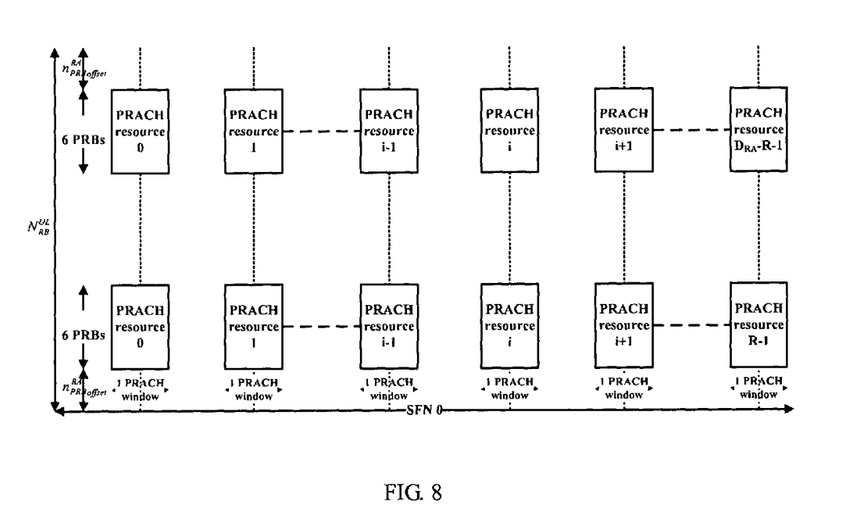
FIG. 8 illustrates final random access resources numbering for frame structure type 2 in case of $0 < R < D_{RA}$ according to embodiments of the present invention.

FIG. 8 illustrates final random access resources numbering for frame structure type 2 in case of the 0<R<$D_{RA}$ according to embodiments of the present invention.

Similar to FIG. 7, FIG. 8 has shown the final numbering for PRACH resources within one radio frame of SFN 0 in case of 0<R<$D_{RA}$ for frame structure type 2. As can be seen, the $D_{RA}$ PRACH resources in the radio frame of SFN 0 is renumbered as 0, 1, ..., i−1, i, ..., R−1, 0, 1, ..., $D_{RA}$−R−1 in time first and then in frequency.

Having obtained the final number (i.e., the serial number X') of each random access resource within P radio frames, a mapping relationship may be established between R root sequences and any random access resource within the P radio frames.

As described with respect to FIG. 1, the mapping relationship can be expressed by Equation 4 as blow:

$$ID'_{root}=ID_{root}+X'; \quad (Eq. 4)$$

where $ID'_{root}$ is a logic index of the root sequence allocated to a specific random access resource, $ID_{root}$ is a logic index of the initial root sequence among R root sequences, X' is a serial number indicating the order of the specific random access resource within the P radio frames, and X' is one of the value in the range of [0, 1, 2, ..., R−1].

Finally, the logic index $ID'_{root}$ of the root sequence can be converted to a corresponding physical index of the root sequence according to e.g. 3GPP TS 36.211. Then, available preambles sequences can be derived based on cyclic shifts of the root sequence for this specific random access resource. With the proposed mapping mechanism, both UE and BS can eventually know which preambles should be transmitted/detected on each specific PRACH resource.

More Specifically, both UE and BS could use the following mapping relationship to generate/detect the preambles on each specific PRACH resource:

On the $X^{th}$ (X=0, 1, 2, ... $D_{RA} \geq 1$, if $D_{RA} \geq 1$; X=0 if $D_{RA}$=0.5) random access resource of a radio frame with SFN k, the preambles to be transmitted/detected should satisfy the following formula:

floor(preambleID/N)=(k mod P)×$D_{RA}$+X if (k mod P)×$D_{RA}$+X<R&$D_{RA}$≤R floor(preambleID/N)=X if $D_{RA}$≤R≤(k mod P)×$D_{RA}$+X, floor(preambleID/N)=X'=(X mod R) if 0<R<$D_{RA}$  (Eq. 8)

where preambleID is the ID of preamble, and preambleID is one of the value in the range of [0, 1, 2, ..., M–1]; k is the SFN of the current radio frame, and if $D_{RA}$=0.5 and all the PRACH resources are located in the odd radio frames according to the PRACH configuration index, the input parameter k in the above formula should be replaced with k'=k–1; X is the local number of PRACH resource; and X' is the serial number (i.e., final number) of PRACH resource.

Please be noted that, if the serial number X' of a random access resource is smaller than R–1, then all the N cyclic shifts can be used to generate the preamble sequences. Otherwise, i.e., the serial number X' of the random access resource is equal to R–1, only N' cyclic shifts can be used to generate the preamble sequences, where N'=M–N×(R–1)  (Eq. 9)

To combine the above equations Eq. 1, Eq. 2, Eq. 3 and Eq. 8, the final formula for the mapping relationship between available preamble IDs (expressed as PID) and PRACH resources of each radio frame SFN k can be obtained as blow:

if {k mod ceiling{ceiling[M/floor($N_{ZC}/N_{CS}$)]/$D_{RA}$}}×
  $D_{RA}$+X<ceiling[M/floor($N_{ZC}/N_{CS}$)]& $D_{RA}$≤
  ceiling[M/floor($N_{ZC}/N_a$)]:floor[PID/floor($N_{ZC}$/
  $N_S$)]={k mod ceiling{ceiling[M/floor($N_{ZC}/N_{CS}$)]/
  $D_{RA}$)}}×$D_{RA}$+X;

if $D_{RA}$≤ceiling[M/floor($N_{ZC}/N_{CS}$)]≤
  {k mod ceiling{ceiling[M/floor($N_{ZC}/N_{CS}$)]/
  $D_{RA}$}}×$D_{RA}$+X:floor[PID/floor($N_{ZC}/N_{CS}$)]=X;

if 0<ceiling[M/floor($N_{ZC}/N_{CS}$)]<
  $D_{RA}$ floor[PID/floor($N_{ZC}/N_{CS}$)]=X'=
  (X mod R)=(X mod ceiling[M/floor($N_{ZC}/N_{CS}$)])  (Eq. 10)

As seen from the final equation Eq. 10, some major parameters in the formula, such as $N_{ZC}$, $N_{CS}$, and $D_{RA}$ are configured by higher layers during cell setup; parameter M is equal to 64 according to current LTE systems; parameters X and X' can also be determined by PRACH configuration index during cell setup. So, actually these input parameters are constants after cell setup. Only SFN k is the possible unique dynamic input parameter to the formula.

The output from Eq. 10 are the available preamble ID(s) (expressed as PID) on each specific PRACH resource for both UE and BS. Therefore, if both UE and BS use the unified equation (Eq. 10) to generate preamble sequences on each specific PRACH resource, there will be no intra-cell interference from multiple random access attempts because of the "zero cross-correlation" property. Since SFN in both UE and BS sides is consistent, the available preambles calculated by TIE and BS on each specific PRACH resource must be consistent as well. Then, the success rate of preamble detection and random access can be increased remarkably.

Figure 9:
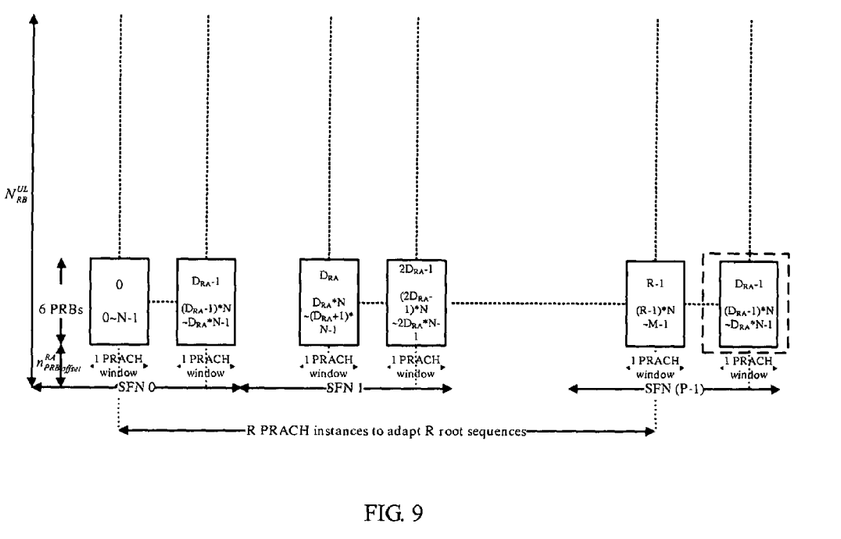
FIG. 9 illustrates final mapping between preambles and random access resources for frame structure type 1 in case of $R \geq D_{RA}$ according to embodiments of the present invention.

FIG. 9 illustrates final mapping between preambles and random access resources for frame structure type 1 in case of R≥$D_{RA}$ according to embodiments of the present invention.

FIG. 9 has shown PRACH resources within P consecutive radio frames of SFN 0, SFN 1, SFN (P–1) in case of R≥$D_{RA}$. As can be seen, R PRACH resources within the P radio frames are used to adapt R root sequences. In each block for the PRACH resource, the upper number indicates the serial number of the PRACH resource, and the lower numbers indicates the IDs of preambles which can be carried by the PRACH resource.

Accordingly, the PRACH resource with a serial number of 0 will be used to carry preambles with ID of 0~N–1 which are generated from the initial root sequence $ID_{root}$ of the R root sequences, the PRACH resource 1 will be used to carry preambles N~2N–1 which are generated from a next root sequence $ID_{root}$+1 of the R root sequences, the PRACH resource $D_{RA}$ will be used to carry preambles $D_{RA}$*N~($D_{RA}$+1)*N–1 which are generated from a root sequence $ID_{root}$+$D_{RA}$ of the R root sequences, and so on. The PRACH resource with a serial number of R–1 will be used to carry preambles with ID of (R–1)*N~M–1 which are generated from the last root sequence $ID_{root}$+R–1 of the R root sequences.

Further, in the last radio frame of SFN (P–1), in this example shown in FIG. 9, the last PRACH resource $D_{RA}$–1 in the dotted line frame will be used to carry preambles with ID of ($D_{RA}$–1)*N~$D_{RA}$*N–1 which are generated from a root sequence $ID_{root}$+$D_{RA}$–1 of the R root sequences.

Figure 10:
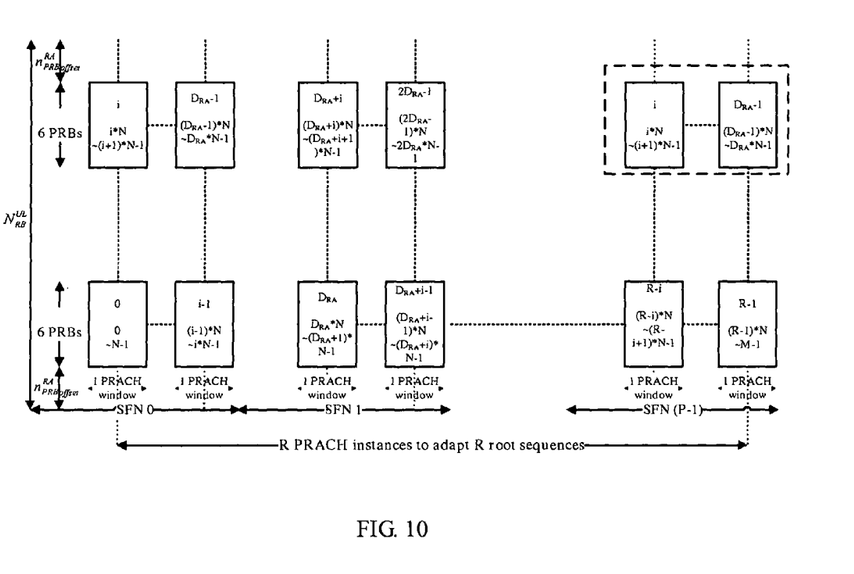
FIG. 10 illustrates final mapping between preambles and random access resources for frame structure type 2 in case of $R \geq D_{RA}$ to embodiments of the present invention.

FIG. 10 illustrates final mapping between preambles and random access resources for frame structure type 2 in case of R≥$D_{RA}$ according to embodiments of the present invention.

Similar to FIG. 9, FIG. 10 has shown PRACH resources within P consecutive radio frames of SFN 0, SFN 1, ..., SFN (P–1) in case of R≥$D_{RA}$. As can be seen, R PRACH resources within the P radio frames are used to adapt R root sequences. Accordingly, the first $D_{RA}$ PRACH resources in the radio frame of SFN 0 will be used to carry preambles generated from a respective one of the first $D_{RA}$ root sequences of the R root sequences sequentially in time first and then in frequency. For example, the PRACH resource with a serial number of 0 will be used to carry preambles with ID of 0~N–1 which are generated from the initial root sequence $ID_{root}$ of the R root sequences, the PRACH resource i–1 will be used to carry preambles (i–1)*N~i*N–1 which are generated from a root sequence $ID_{root}$+i–1 of the R root sequences, and the PRACH resource $D_{RA}$ will be used to carry preambles $D_{RA}$*N ($D_{RA}$+1)*N–1 which are generated from a root sequence $ID_{root}$+$D_{RA}$ of the R root sequences.

Then, the second $D_{RA}$ PRACH resources in the radio frame of SFN 1 will be used to carry preambles generated from a respective one of the second $D_{RA}$ root sequences of the R root sequences sequentially in time first and then in frequency.

The PRACH resource with a serial number of R–1 will be used to carry preambles with ID of (R–1)*N~M–1 which are generated from the last root sequence $ID_{root}$+R–1 of the R root sequences.

In the last radio frame of SFN (P−1), in this example shown in FIG. 10, the last S=P×$D_{RA}$−R PRACH resources in the dotted line frame have serial numbers of i, i+1, . . . , $D_{RA}$−1, and they will be used to carry preambles from a respective one of S root sequences $ID_{root}$+i~$ID_{root}$+$D_{RA}$−1 of the R root sequences sequentially.

Figure 11:
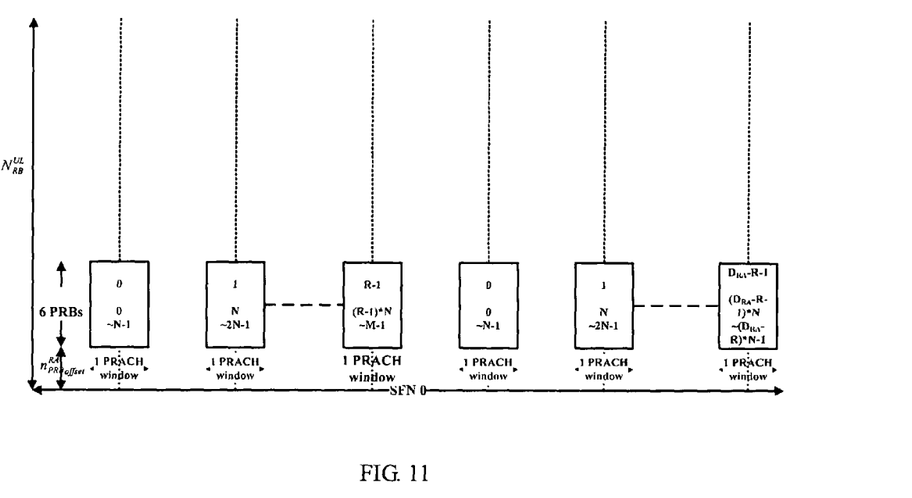
FIG. 11 illustrates final mapping between preambles and random access resources for frame structure type 1 in case of $0 < R < D_{RA}$ according to embodiments of the present invention.

FIG. 11 illustrates final mapping between preambles and random access resources for frame structure type 1 in case of 0<R<$D_{RA}$ according to embodiments of the present invention.

FIG. 11 has shown PRACH resources within one radio frame of SFN 0 in case of 0<R<$D_{RA}$. As can be seen, the serial numbers of the $D_{RA}$ PRACH resources in the radio frame of SFN 0 is 0, 1, . . . , R−1, 0, 1, . . . , $D_{RA}$−R−1. Accordingly, the PRACH resource with a serial number of 0 will be used to carry preambles with ID of 0~N−1 which are generated from the initial root sequence $ID_{root}$ of the R root sequences, the PRACH resource 1 will be used to carry preambles N~2N−1 which are generated from a next root sequence $ID_{root}$+1 of the R root sequences, and so on. The PRACH resource with a serial number of R−1 will be used to carry preambles with ID of (R−1)*N~M−1 which are generated from the last root sequence $ID_{root}$+R−1 of the R root sequences.

Figure 12:
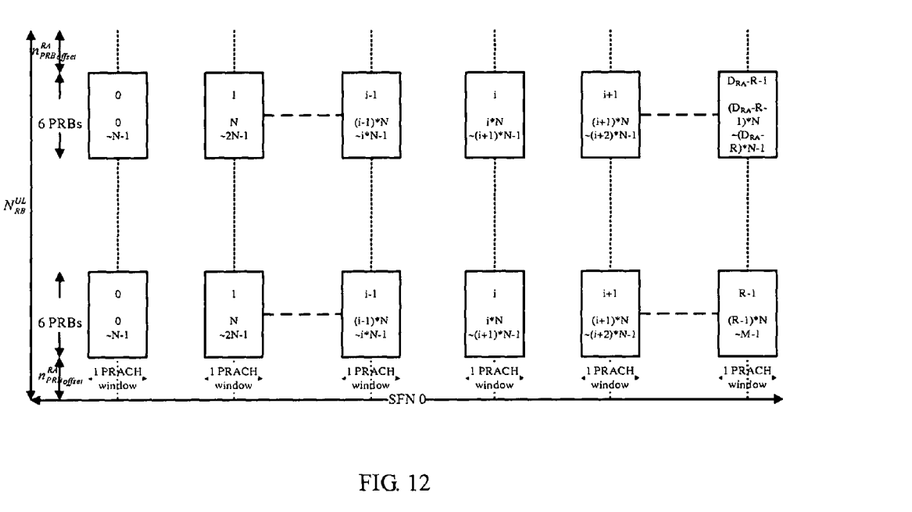
FIG. 12 illustrates final mapping between preambles and random access resources for frame structure type 2 in case of $0 < R < D_{RA}$ according to embodiments of the present invention.

FIG. 12 illustrates final mapping between preambles and random access resources for frame structure type 2 in case of 0<R<$D_R$, according to embodiments of the present invention.

Similar to FIG. 11, FIG. 12 has shown PRACH resources within one radio frame of SFN 0 in case of 0<R<$D_{RA}$ for frame structure type 2. As can be seen, the serial numbers of the $D_{RA}$ PRACH resources in the radio frame of SFN 0 is 0, 1, . . . , i−1, i, . . . , R−1, 0, 1, . . . , $D_{RA}$−R−1 in time first and then in frequency.

Accordingly, the PRACH resource with a serial number of 0 will be used to carry preambles with ID of 0~N−1 which are generated from the initial root sequence $ID_{root}$ of the R root sequences, the PRACH resource 1 will be used to carry preambles N~2N−1 which are generated from a next root sequence $ID_{root}$+1 of the R root sequences, and so on. The PRACH resource with a serial number of R−1 will be used to carry preambles with ID of (R−1)*N~M−1 which are generated from the last root sequence $ID_{root}$+R−1 of the R root sequences.

Figure 13:
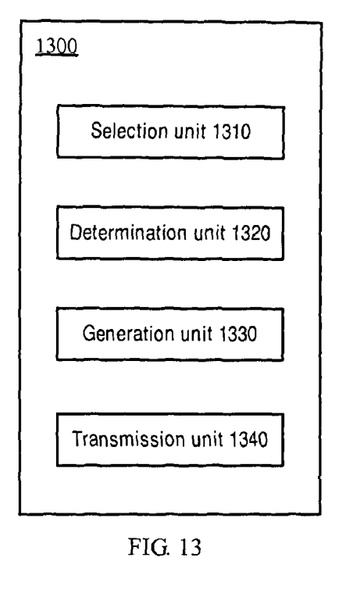
FIG. 13 is a schematic block diagram of a user equipment 1300 that may be configured to practice exemplary embodiments according to some embodiments of the present invention.

FIG. 13 is a schematic block diagram of a user equipment 1300 that may be configured to practice exemplary embodiments according to some embodiments of the present invention.

As shown in FIG. 13, the user equipment 1300 may comprise a selection unit 1310, a determination unit 1320, a generation unit 1330, and a transmission unit 1340.

The selection unit 1310 may be configured to select a random access resource for transmitting a preamble.

The determination unit 1320 may be configured to determine one root sequence allocated to the selected random access resource based on a mapping relationship between root sequences and random access resources. As described above, the mapping relationship is established based on a rule that a random access resource carries preambles generated from a same root sequence.

In some embodiments, the determination unit 1320 may be configured to determine an order of the root sequence based on an order of an initial root sequence and an order of the random access resource within P radio frames, wherein P≥1, and the P radio frames are used for carrying multiple (NI) preambles.

The order of the random access resource within P radio frames may be determined according to the above equation Eq. 4. Detailed description thereof may be referenced to previous disclosure with respect to method flows.

The generation unit 1330 may be configured to generate a preamble based on the determined root sequence.

The transmission unit 1340 may be configured to transmit the generated preamble on the selected random access resource.

It should be understood, the units 1310-1340 contained in the user equipment 1300 are configured for practicing exemplary embodiments of the present invention. Thus, the operations and features described above with respect to FIG. 1 also apply to the apparatus 1300 and the units therein, and the detailed description thereof is omitted here.

Figure 14:
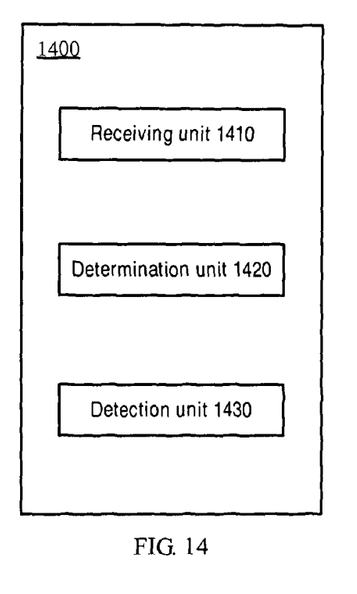
FIG. 14 is a schematic block diagram of a base station 1400 that may be configured to practice exemplary embodiments according to some embodiments of the present invention.

FIG. 14 is a schematic block diagram of a base station 1400 that may be configured to practice exemplary embodiments according to some embodiments of the present invention.

As shown in FIG. 14, the base station 1400 may comprise a receiving unit 1410, a determination unit 1420, and a detection unit 1430.

The receiving unit 1410 may be configured to receive signal from a random access resource.

The determination unit 1420 may be configured to determine one root sequence allocated to the received random access resource based on a mapping relationship between root sequences and random access resources. As described above, the mapping relationship is established based on a rule that a random access resource carries preambles generated from a same root sequence.

The mapping relationship is the same as that described with respect to FIG. 1, and thus the function of the determination unit 1420 is the same as the determination unit 1320 in the user equipment 1300. Thus, in each specific radio frame in which random access resources have been configured according to e.g. one PRACH configuration index, both UE and BS will use a unified formula (i.e., Eq. 4) to calculate which root sequence should be used to generate/detect the preambles on each specific random access resource. Thereby, the available preambles calculated by UE and BS on each specific random access resource may be consistent.

Having determined the root sequence allocated to the random access resource by the determination unit 1420, the detection unit 1430 of the BS 1400 may be configured to detect a preamble carried on the random access resource based on the determined root sequence.

The detection unit 1430 will generate all the N preambles based on the determined root sequence, and detect possible preambles on the random access resource by correlating the N preambles with the received signal on that random access resource, respectively. Peaks of the correlation indicate the presence of preambles.

It should be understood, the units 1410-1430 contained in the BS 1400 are configured for practicing exemplary embodiments of the present invention. Thus, the operations and features described above with respect to FIG. 2 also apply to the BS 1400 and the units therein, and the detailed description thereof is omitted here.

Figure 15:
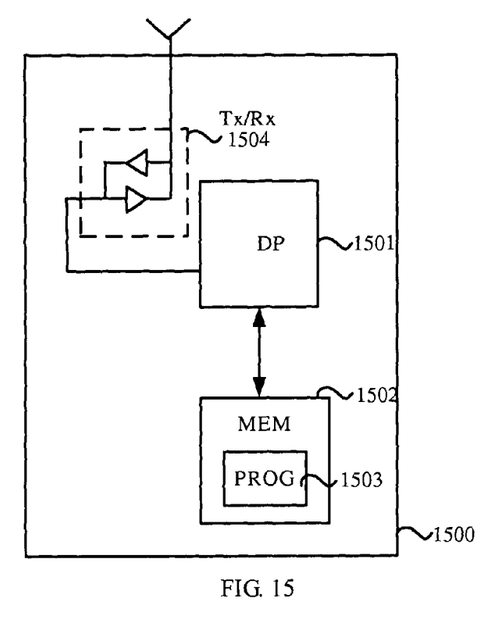
FIG. 15 illustrates a simplified block diagram of an entity 1500 that is suitable for use in practicing exemplary embodiments of the present invention.

FIG. 15 illustrates a simplified block diagram of an entity 1500 that is suitable for use in practicing exemplary embodiments of the present invention. The entity 1500 may be an entity at the network side, for example, a base station, or an entity at the user side, e.g., a user equipment.

As shown in FIG. 15, the entity 1500 includes a data processor (DP) 1501, a memory (MEM) 1502 coupled to the DP 1501, and a suitable RF transmitter TX and receiver RX 1504 coupled to the DP 1501. The MEM 1502 stores a program (PROG) 1503. The TX/RX 1504 is for bidirectional wireless communications. Note that the TX/RX 1504 has at least one antenna to facilitate communication, though in practice a BS or a UE may have several ones. The entity 1500 may be coupled via a data path to one or more external networks or systems, such as the internet, for example.

The PROG 1503 is assumed to include program instructions that, when executed by the associated DP 1501, enable the entity 1500 to operate in accordance with the exemplary embodiments of this invention, as discussed herein with the methods in FIGS. 1 and 2. For example, the PROG 1503 and the DP 1501 may embody the determination unit 1320/1420, the generation unit 1330, and the detection unit 1430 to perform the respective functions.

The embodiments of the present invention may be implemented by computer software executable by the DP 1501 of the entity 1500, or by hardware, or by a combination of software and hardware.

The MEM 1502 may be of any type suitable to the local technical environment and may be implemented using any suitable data storage technology, such as semiconductor based memory devices, magnetic memory devices and systems, optical memory devices and systems, fixed memory and removable memory, as non-limiting examples. While only one MEM is shown in the entity 1500, there may be several physically distinct memory units in the entity 1500. The DP 1501 may be of any type suitable to the local technical environment, and may include one or more of general purpose computers, special purpose computers, microprocessors, digital signal processors (DSPs) and processors based on multicore processor architecture, as non limiting examples. The entity 1500 may have multiple processors, such as for example an application specific integrated circuit chip that is slaved in time to a clock which synchronizes the main processor.

Exemplary embodiments of the present invention have been described above with reference to block diagrams and flowchart illustrations of methods, apparatuses (i.e., systems). It will be understood that each block of the block diagrams and flowchart illustrations, and combinations of blocks in the block diagrams and flowchart illustrations, respectively, can be implemented by various means including computer program instructions. These computer program instructions may be loaded onto a general purpose computer, special purpose computer, or other programmable data processing apparatus to produce a machine, such that the instructions which execute on the computer or other programmable data processing apparatus create means for implementing the functions specified in the flowchart block or blocks.

The foregoing computer program instructions can be, for example, sub-routines and/or functions. A computer program product in one embodiment of the invention comprises at least one computer readable storage medium, on which the foregoing computer program instructions are stored. The computer readable storage medium can be, for example, an optical compact disk or an electronic memory device like a RAM (random access memory) or a ROM (read only memory).

While this specification contains many specific implementation details, these should not be construed as limitations on the scope of any implementation or of what may be claimed, but rather as descriptions of features that may be specific to particular embodiments of particular implementations. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

It should also be noted that the above described embodiments are given for describing rather than limiting the invention, and it is to be understood that modifications and variations may be resorted to without departing from the spirit and scope of the invention as those skilled in the art readily understand. Such modifications and variations are considered to be within the scope of the invention and the appended claims. The protection scope of the invention is defined by the accompanying claims. In addition, any of the reference numerals in the claims should not be interpreted as a limitation to the claims. Use of the verb "comprise" and its conjugations does not exclude the presence of elements or steps other than those stated in a claim. The indefinite article "a" or "an" preceding an element or step does not exclude the presence of a plurality of such elements or steps.

What is claimed is:

1. A method for transmitting a preamble by a user equipment to a base station, said method comprising:

selecting a random access resource for transmitting a preamble;

determining one root sequence allocated to said random access resource based on a mapping relationship between root sequences and random access resources;

generating a preamble based on said root sequence; and transmitting said preamble on said random access resource;

wherein said mapping relationship is established based on a rule that a random access resource carries preambles generated from a same root sequence.

2. The method of claim 1, wherein according to said mapping relationship, an order of the root sequence is determined based on an order of an initial root sequence and an order of the random access resource within P radio frames, P≥1, and said P radio frames are used for carrying multiple preambles.

3. The method of claim 2, wherein the order of the root sequence is expressed by a logic index $ID'_{root}$ of the root sequence, which is determined as:

$$ID'_{root} = ID_{root} + X',$$

wherein ID root is a logic index of the initial root sequence, X' is a serial number indicating the order of the random access resource within the P radio frames, P is the minimum number of radio frames which are required for covering R root sequences, and R is the minimum number of root sequences which are required for generating the multiple preambles, R>1.

4. The method of claim 3, wherein said serial number X' of the random access resource is determined as:
when $R \geq D_{RA}$, $$X' = \begin{cases} (k \bmod P) \times D_{RA} + X & \text{if } (k \bmod P) \times D_{RA} + X < R \\ X & \text{otherwise} \end{cases};$$

when $0 < R < D_{RA}$, $$X' = (X \bmod R);$$

wherein $D_{RA}$ is a density of random access resource per radio frame; X is a local number of the random access resource within one radio frame; k is the system frame number, SFN, of a radio frame where the random access resource is located; and if $D_{RA}=0.5$ and all the random access resources are only in radio frames which have odd SFN, said SFN k in the equation Eq. 6 is replaced with k'=k−1.

5. The method of claim 4, wherein said local number X of the random access resource is determined as:
when $D_{RA} > 1$, the local number X is numbered as 0, 1, . . . , $D_{RA}-1$ sequentially in time first and then in frequency if and only if time multiplexing is not sufficient to hold all the $D_{RA}$ random access resources within one radio frame without overlap in time; and
when $D_{RA}=0.5$, the local number X is numbered as 0.

6. A method for detecting a preamble received from a user equipment, said method comprising:
receiving a signal from a random access resource;
determining one root sequence allocated to said random access resource based on a mapping relationship between root sequences and random access resources; and
detecting a preamble carried on said random access resource based on said root sequence;
wherein said mapping relationship is established based on a rule that a random access resource carries preambles generated from a same root sequence.

7. The method of claim 6, wherein according to said mapping relationship, an order of the root sequence is determined based on an order of an initial root sequence and an order of the random access resource within P radio frames, $P \geq 1$, and said P radio frames are used for carrying multiple preambles.

8. The method of claim 7, wherein the order of the root sequence is expressed by a logic index $ID'_{root}$ of the root sequence, which is determined as:

$$ID'_{root} = ID_{root} + X';$$

wherein ID root is a logic index of the initial root sequence, X' is a serial number indicating the order of the random access resource within the P radio frames, P is the minimum number of radio frames which are required for covering R root sequences, and R is the minimum number of root sequences which are required for generating the multiple preambles, R>1.

9. The method of claim 8, wherein said serial number X' of the random access resource is determined as:
when $R \geq D_{RA}$, $$X' = \begin{cases} (k \bmod P) \times D_{RA} + X & \text{if } (k \bmod P) \times D_{RA} + X < R \\ X & \text{otherwise} \end{cases};$$

when $0 < R < D_{RA}$, $$X' = (X \bmod R);$$

wherein $D_{RA}$ is a density of random access resource per radio frame; X is a local number of the random access resource within one radio frame; k is the system frame number, SFN, of a radio frame where the random access resource is located; and if $D_{RA}=0.5$ and all the random access resources are only in radio frames which have odd SFN, said SFN k in the equation Eq. 6 is replaced with k'=k−1.

10. The method of claim 9, wherein said local number X of the random access resource is determined as:
when $D_{RA} \geq 1$, the local number X is numbered as 0, 1, . . . , $D_{RA}-1$ sequentially in time first and then in frequency if and only if time multiplexing is not sufficient to hold all the $D_{RA}$ random access resources within one radio frame without overlap in time; and
when $D_{RA}=0.5$, the local number X is numbered as 0.

11. A user equipment, comprising a processor circuit and a transmitter circuit, wherein the processor circuit is configured to:
select a random access resource for transmitting a preamble;
determine one root sequence allocated to said random access resource based on a mapping relationship between root sequences and random access resources;
generate a preamble based on said root sequence; and
transmit said preamble on said random access resource, via the transmitter circuit;
wherein said mapping relationship is established based on a rule that a random access resource carries preambles generated from a same root sequence.

12. The user equipment of claim 11, wherein the processor circuit is configured to determine an order of the root sequence based on an order of an initial root sequence and an order of the random access resource within P radio frames, $P \geq 1$, and said P radio frames are used for carrying multiple preambles.

13. The user equipment of claim 12, wherein the order of the root sequence is expressed by a logic index $ID'_{root}$ of the root sequence, and said determination unit is further configured to determine the logic index $ID'_{root}$ of the root sequence as:

$$ID'_{root} = ID_{root} + X'; \quad \text{(Eq. 4)}$$

wherein ID root is a logic index of the initial root sequence, X' is a serial number indicating the order of the random access resource within the P radio frames, P is the minimum number of radio frames which are required for covering R root sequences, and R is the minimum number of root sequences which are required for generating the multiple preambles, R>1.

14. The user equipment of claim 13, wherein the processor circuit is further configured to determine said serial number X' of the random access resource as:
when $R \geq D_{RA}$, $$X' = \begin{cases} (k \bmod P) \times D_{RA} + X & \text{if } (k \bmod P) \times D_{RA} + X < R \\ X & \text{otherwise} \end{cases}; \quad \text{(Eq. 6)}$$

when $0 < R < D_{RA}$, $$X' = (X \bmod R); \quad \text{(Eq. 7)}$$

wherein $D_{RA}$ is a density of random access resource per radio frame; X is a local number of the random access resource within one radio frame; k is the system frame number, SFN, of a radio frame where the random access resource is located; and if $D_{RA}=0.5$ and all the random access resources are only in radio frames which have odd SFN, said SFN k in the equation Eq. 6 is replaced with k'=k−1.

15. A base station, comprising a processor circuit and a receiver circuit, wherein the processor circuit is configured to:
- receive a signal from a random access resource, via the receiver circuit;
- determine one root sequence allocated to said random access resource based on a mapping relationship between root sequences and random access resources; and
- detect a preamble carried on said random access resource based on said root sequence;

wherein said mapping relationship is established based on a rule that a random access resource carries preambles generated from a same root sequence.

16. The base station of claim 15, wherein the processor circuit is configured to determine an order of the root sequence based on an order of an initial root sequence and an order of the random access resource within P radio frames, P≥1, and said P radio frames are used for carrying multiple preambles.

17. The base station of claim 16, wherein the order of the root sequence is expressed by a logic index $ID'_{root}$ of the root sequence, and said determination unit is further configured to determine the logic index $ID'_{root}$ of the root sequence as:

$$ID'_{root} = ID_{root} + X',$$

wherein $ID_{root}$ is a logic index of the initial root sequence, X' is a serial number indicating the order of the random access resource within the P radio frames, P is the minimum number of radio frames which are required for covering R root sequences, and R is the minimum number of root sequences which are required for generating the multiple preambles, R>1.

18. The base station of claim 17, wherein the processor circuit is further configured to determine said serial number X' of the random access resource as:

when $R \geq D_{RA}$, $$X' = \begin{cases} (k \bmod P) \times D_{RA} + X & \text{if } (k \bmod P) \times D_{RA} + X < R \\ X & \text{otherwise} \end{cases}; \quad (Eq.\ 6)$$

when $0 < R < D_{RA}$, $$X' = (X \bmod R); \quad (Eq.\ 7)$$

wherein $D_{RA}$ is a density of random access resource per radio frame; X is a local number of the random access resource within one radio frame; k is the system frame number, SFN, of a radio frame where the random access resource is located; and if $D_{RA}=0.5$ and all the random access resources are only in radio frames which have odd SFN, said SFN k in the equation Eq. 6 is replaced with k'=k−1.

* * * * *